UNITED STATES PATENT OFFICE.

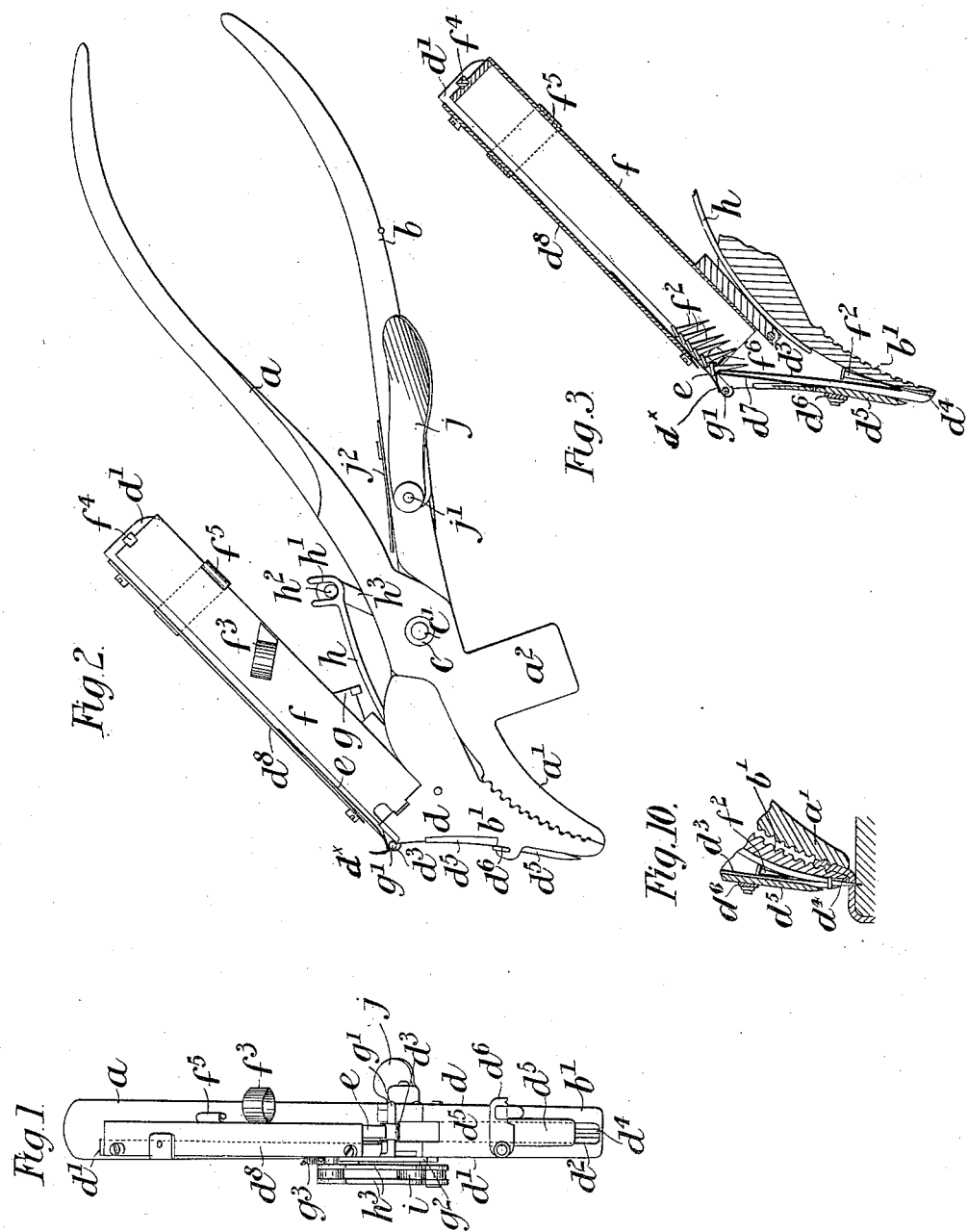

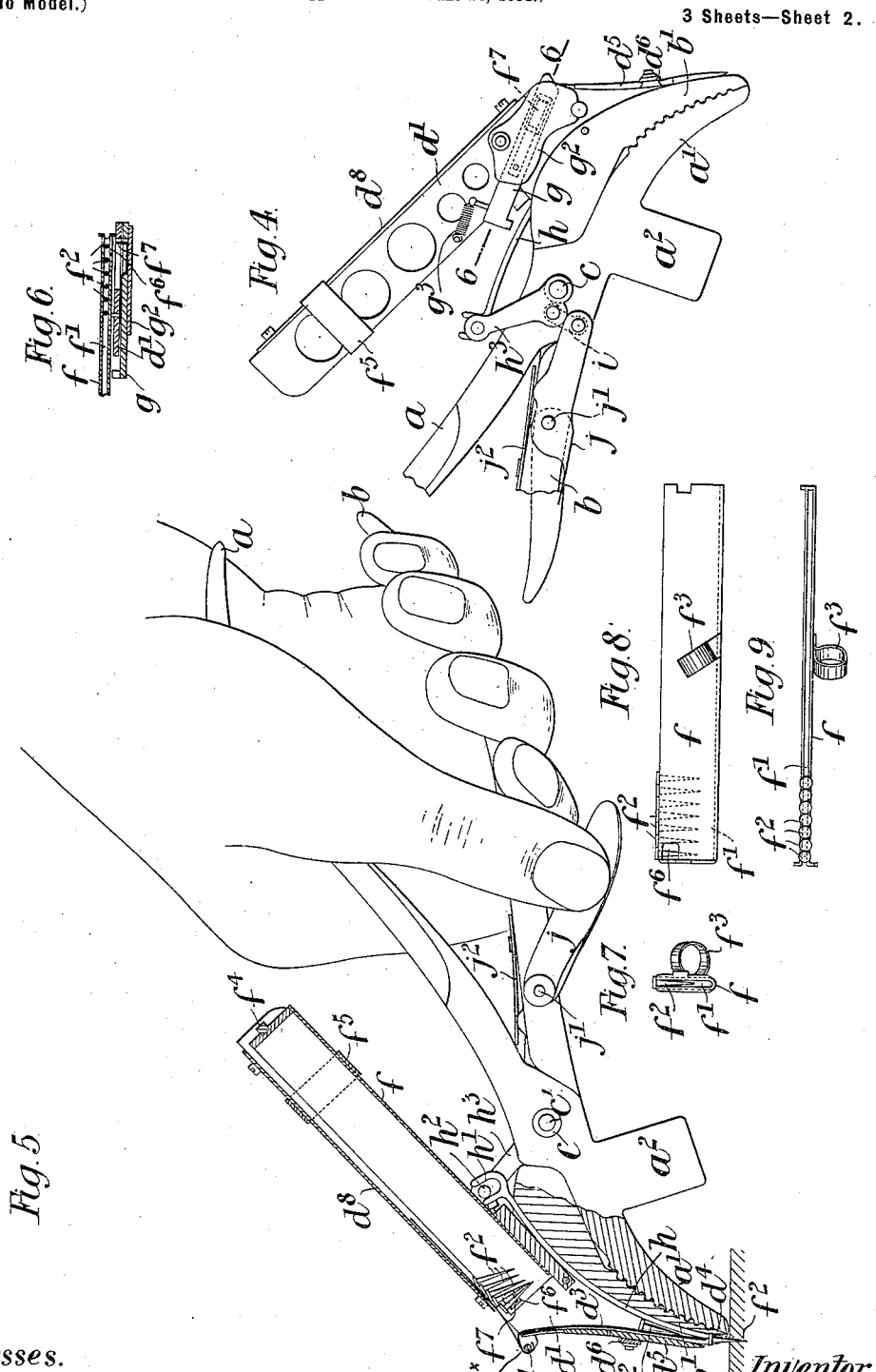

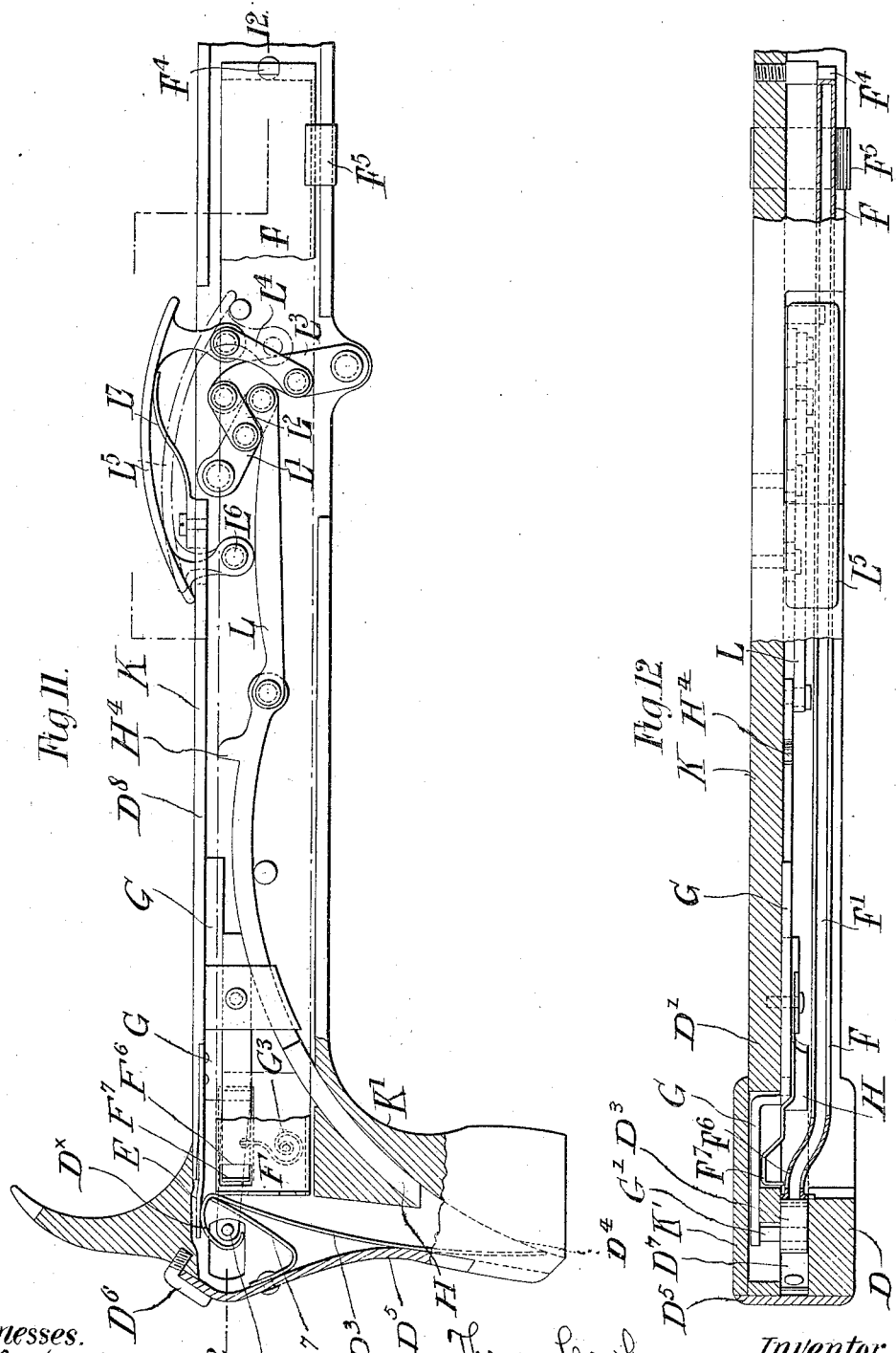

THOMAS COWBURN, OF GLOUCESTER, ENGLAND.

HAND TACKING-TOOL.

SPECIFICATION forming part of Letters Patent No. 652,167, dated June 19, 1900.

Application filed June 20, 1898. Serial No. 683,976. (No model.)

*To all whom it may concern:*

Be it known that I, THOMAS COWBURN, a subject of the Queen of Great Britain, residing at Gloucester, England, have invented a new and useful Hand Tacking-Tool for Use by Upholsterers, Carpet-Placers, Bootmakers, Label-Attachers, or the Like, (for which I have applied for a patent in Great Britain, No. 3,788, dated February 15, 1898,) of which the following is a specification.

This invention relates to a hand tacking-tool for use by upholsterers, carpet-placers, bootmakers, label-attachers, or the like, and has for its object to construct a tool—for instance, a pair of pincers or a hammer—which carries a quantity of loose tacks designed by the pressure of a trigger or thumb-lever to be delivered from a tack-carrier to the nose or projection of the pincers or hammer forming the tool and either to be forced into the material in position to be driven by a blow from the hammer-face or to be delivered and retained with the point protruding from the said nose, so that when the said tool is pressed toward the material to be tacked the tack-point is forced into the material and remains in position to be either wholly or partially driven in, as previously explained, the said tool being also adapted to be quickly and easily supplied with a freshly-charged tack-carrier.

In the accompanying drawings, Figure 1 is a front view of a hand tacking-tool made according to the invention, the said tool being in the form of a pair of pincers. Fig. 2 is a side elevation of the same. Fig. 3 is a longitudinal section through the tack-carrier and the upper jaw of the pincers. Fig. 4 is an elevation of the greater portion of the tool seen from the opposite side to that shown in Fig. 2. Fig. 5 is a sectional side elevation of the tool, showing the manner in which it is used. Fig. 6 is a section on the line 6 6, Fig. 4. Figs. 7, 8, and 9 are a front elevation, side elevation, and plan, respectively, of the tack-carrier. Fig. 10 is a section of the front part of the tool, showing how it is used when the pincers grip the material to be tacked. Fig. 11 is a sectional elevation showing the invention applied to a hammer; and Fig. 12 is a sectional plan thereof, the section being taken on the line 12 12, Fig. 11.

Referring to the form of my invention shown in Figs. 1 to 10, in which I have shown it applied to a pair of pincers, $a$ and $b$ are the two levers forming the upper and lower handles and having the lower and upper jaws $a'$ and $b'$, respectively, and being pivoted together by a joint-pin $c$, having a central hole, in which the lever-pin $c'$ works. The upper jaw $b'$ is provided with a tack-carrier holder comprising two lateral plates or flanges $d$ $d'$, secured to or made in one with the said jaw $b'$ and having a central slot or opening $d^2$, closed by a spring-strip $d^3$. The upper surface of the upper jaw $b'$—that is to say, the bottom of the space inclosed by the two lateral plates $d$ and $d'$—is grooved, as shown at $d^4$, Figs. 1, 3, and 5, the said groove being designed to serve as a guide for the tack-point when the tack is being ejected, as hereinafter described. The spring $d^3$ is kept in position by a plate $d^5$, covering the front central opening $d^2$ and held in position by the catch $d^6$. To the upper end of this plate $d^5$ there is attached a spring $d^7$, which bears against the upper end of the spring-strip $d^3$ and normally holds it against the open end of the tack-carrier, hereinafter described. The said plate $d^5$ serves to take the pressure on the spring $d^3$ and prevents the head of the tack forcing the said spring away too much.

The plate $d'$ is longer than the plate $d$ and is provided with an overhanging strip or roof $d^8$, to which is attached a spring $e$, resting upon and adapted to be raised by the front spring $d^3$ and serving for guiding the tacks and preventing them from being jerked out of the tack-carrier. This spring $e$ has a peculiar undulating motion imparted to it, caused by its coming into contact with a projection on the overhanging strip.

The tack-carrier is advantageously formed of a plate $f$, bent to a V or U shape, Figs. 7, 8, and 9, so that the upturned edges or sides form a groove or receptacle $f'$ for the tacks $f^2$, which can slide along it. The said carrier $f$ is provided with a handle $f^3$ and is held between the lateral plates $d$ and $d'$ at the front end, and at the rear end it is held by a pin or catch $f^4$ and spring $f^5$ to facilitate its quick removal and replacement by another when required—for instance, when emptied of tacks. The tack-carrier $f$ is provided with a slit or hole $f^6$ at the front end, into which can pass a tack divider and retainer $f^7$, formed of a spring piece or plate, one end of which is attached to the plate $d'$ and the other end formed to pass through the slit or hole $f^6$ in the tack-carrier $f$ and divide the front or end tack from the rest by entering between them, so as to retain the second tack just below the head thereof. This retainer $f^7$ is forced into the slot $f^6$ by a sliding piece $g$, which also has a pin $g'$ engaging with a forwardly-projecting hook portion $d^\times$ of the spring $d^3$, so as to press forward the top end of the spring $d^3$ when it is slid forward, and thereby release the disengaged tack. The sliding piece $g$ is guided along the side of the lateral plate $d'$ in a guide $g^2$, secured to the lateral plate $d'$, and receives its motion from a lever hereinafter described.

$g^3$ is a spring for normally holding the slide $g$ in its rearmost position.

$h$ is the tack-ejector, the said ejector being curved, as shown, and also preferably formed to match the bottom of the groove. It consists of a rod with a bifurcation or slot $h'$ at the rear end, with which a pin $h^2$ on a lever $h^3$ engages. The lever $h^3$ is fixed on the pin $c'$, which passes through or works in the stud $c$, by means of which the two jaws $a'$ and $b'$ are hinged together, so that the said jaws can be operated without affecting the tack-ejector mechanism, and vice versa.

$i$ is a link one end of which is pivoted to the lever $h^3$ near the fulcrum thereof and the other end of which is hinged to a thumb-lever $j$, pivoted at $j'$ to the lower handle or lever $b$. As will be clearly seen, the depression of the said thumb-lever $j$ when grasping the pincers, as illustrated in Fig. 5, will move forward the ejector $h$ along the groove $d^4$ for ejecting a tack, as hereinafter described.

$j^2$ is a spring for returning the thumb-lever to its normal position—that is to say, the position shown in Figs. 2 and 4. The front spring $d^3$ performs various functions—that is to say, it retains the tacks in the tack-carrier while the tack divider and retainer is withdrawn, it moves or raises the front edge of the first tack-head to assist in bringing it out of the tack-carrier, it guides or keeps the tack in the groove during its forward and downward movement, and retains it in position at the nose or end of the groove for entering the material to be tacked.

The tool is employed as follows: The material which is to be tacked down is, for example, gripped by the jaws $a'$ $b'$ of the pincers, as shown in Fig. 10, and the thumb-lever $j$ is depressed by the thumb, as indicated in Fig. 5, so as to press forward the upper end of the lever $h^3$, and thereby slide forward the ejector $h$ from the normal position (shown in Figs. 2 and 4) and eject the tack which has been released from the tack-carrier and allowed to drop in front of the said ejector, as hereinafter described. The lever in its forward movement strikes against the rear end of the slide $g$, as indicated in Fig. 5, and pushes the same forward in its guide $g^2$. The forward movement of the said slide $g$ forces the spring-plate $f^7$, forming the tack divider and retainer, through the slit or hole $f^6$ in the tack-carrier $f$, so that the said retainer passes between the first and second tacks—that is to say, separates the front tack from all the rest. The forward motion of the said sliding piece $g$ then pushes forward the upper end of the front spring $d^3$, as above mentioned, thereby releasing the front tack, which drops into the space between the two lateral plates $d$ $d'$, as clearly shown in Fig. 5, the said tack being then retained in the said space until the ejector has been withdrawn and again pushed forward, when it is forced in or through the material to be tacked or is held so that by pressing forward the nose of the tool it is forced into the material and driven in by means of the hammer $a^2$ on the lower jaw $a'$.

In Figs. 11 and 12 I have illustrated my tacking arrangement as applied to a hammer, the principle being exactly similar to that above described and the construction only being altered to adapt it to the different tool, in these figures the parts corresponding to the similar parts in Figs. 1 to 10, inclusive, except that capital letters are employed in Figs. 11 and 12 and small letters in Figs. 1 to 10.

In the arrangement shown all the mechanism is fitted inside the hammer-shaft K and head K'. The head K' is made with a front space for receiving the released tacks, and also with a curved guide for the ejector H, which is operated through the medium of the link L, lever L', link L², lever L³, and link L⁴ from the lever L⁵, which is pivoted to the hammer-shaft at L⁶ and is normally held in its uppermost position by the spring L⁷. The tack-ejector is provided with a stop H⁴, which strikes a lateral sliding piece G, so as to force the spring piece or retainer F⁷ through the slit or hole F⁶ in the tack-carrier F and separate the front tack in the said carrier from the remaining tacks in the manner hereinbefore described, and also to release the said front tack by pressing forward the front spring D³ and raising the top spring E, also in the manner hereinbefore described.

To refill the tack-carrier, any ordinary means may be used, such as a hopper with a couple of plates forming a groove for the tacks to slide in and against which the tack-carriers can be held to be refilled.

Having now particularly described and ascertained the nature of my said invention and in what manner the same is to be performed, I declare that what I claim is—

1. The combination with a tool provided with a tack-delivery passage, of a tack-carrier, a spring having a portion normally closing the delivery end of said carrier and a portion lying in said tack-delivery passage between the carrier and the delivery end of said passage, an ejector for forcing a tack through said passage between one wall thereof and said spring, an actuating device for said ejector and connections between said actuating device and the portion of said spring adjacent to the tack-carrier for pushing it away from the tack-carrier, substantially as described.

2. The combination with a tool provided with a tack-delivery recess, and with means for supporting a tack-carrier, of a tack-carrier, a flat spring lying in said recess and forming one wall of a tack-delivery passage, and having a portion normally closing the delivery end of said tack-carrier, a slide, operatively connected with said spring for withdrawing it from said carrier, a tack-retainer, having a part adapted to be projected into said carrier between the first and second tacks therein and a part in the path of a part connected with said slide, a tack-ejector adapted to pass along said delivery-recess beneath said spring, an operating-lever, and connections between said operating-lever and said ejector and said slide, substantially as described.

3. The combination with a tool provided with a tack-delivery passage, and means for supporting a tack-carrier, of a detachable tack-carrier, provided with a vertically-disposed slot for receiving tacks, said slot being open at the end adjacent to said delivery-passage and closed at its other end, said carrier being provided with an aperture on one side adjacent to its delivery end, communicating with its slot, a spring lying in said delivery-passage, and normally closing the delivery end of said carrier, said spring having a portion extending from the carrier toward the outer end of said delivery-passage, a tack-retainer secured to said tool, having a part adapted to be projected through said aperture in the side of the carrier in rear of the position of the first tack therein, a slide operatively connected to said spring adjacent to the carrier for moving the same away from the carrier, said slide having a portion for engaging and operating said tack-retainer, a tack-ejector adapted to pass through a portion of said delivery-passage beneath said spring, a lever pivoted to the tool, and operative connections between the said lever and said slide and ejector, substantially as described.

4. The combination with the pincers having one jaw thereof provided with a tack-delivery passage, and means for supporting a tack-carrier, of a tack-carrier, carried by said jaw, a spring normally closing the delivery end of said tack-carrier, a curved tack-ejector adapted to slide through a portion of said delivery-passage, a movable tack-retainer, a slide operatively connected with said tack-retainer and said spring, an operating-lever secured to one of the handles of the pincers and operative connections between said lever and said ejector and said slide, substantially as described.

5. The combination with the pincers having one jaw thereof provided with an open recess and provided with means for supporting a tack-carrier, of a tack-carrier, a flat spring lying in said recess, forming a tack-delivery passage between it and the inner wall of the recess, and having a portion normally closing the delivery end of the tack-carrier, a tack-ejector mounted in said pincer-jaw and adapted to be moved through a portion of said delivery-passage, a movable tack-retainer, a plate located in said jaw-recess outside of said spring, an operating-lever mounted on one of the handles of the pincers, and operative connections between said lever, and the said spring, tack-retainer and tack-ejector, substantially as described.

6. The combination with the pincers, having one jaw thereof provided with a tack-delivery passage, and means for supporting a tack-carrier, of a detachable tack-carrier provided with a vertical slot for receiving the tacks, open at the end adjacent to said delivery-passage and closed at the other end, said carrier having an aperture in one side adjacent to its open end to receive a tack-retainer, a flat spring normally closing the delivery end of said carrier, and provided with a hook portion at its upper end, a tack-retainer consisting of a spring-arm provided with an angular portion adapted to be projected through the aperture in said carrier, a slide mounted in said jaw, provided with a pin engaging the hook portion of said spring, and having a part for engaging and actuating said tack-retainer, a tack-ejector movably mounted in said jaw, an operating-lever secured to one of the handles of said pincers, and operative connections between the said lever and said ejector and said slide, substantially as described.

7. The combination with the pincers having a jaw thereof provided with a tack-delivery passage, and a support for a tack-carrier having a laterally-projecting top flange, of a detachable carrier provided with a vertical tack-receiving slot, open at the top and at one end of the carrier, said carrier having an aperture in one side adjacent to the open end of said slot, means for detachably securing said carrier to said support, so that the top flange of the latter will overlie the slot in said carrier, a spring normally closing the open end of the said slot, a tack-retainer, adapted to pass through the side aperture in said carrier, the tack-ejector, an operating-lever, and connections between said lever and said ejector, said spring and said retainer, substantially as described.

THOMAS COWBURN.

Witnesses:
ARNOLD H. PALIN,
W. J. H. PALIN.